(12) United States Patent
Avila (10) Patent No.: US 6,393,627 B1
(45) Date of Patent: May 28, 2002

(54) WATERLESS TOILET CABANA

(76) Inventor: Frank J. Avila, P.O. Box 180056, Coronado, CA (US) 92178

( * ) Notice: Subject to any disclaimer, the term of this patent is extended or adjusted under 35 U.S.C. 154(b) by 0 days.

(21) Appl. No.: 09/251,986

(22) Filed: Feb. 17, 1999

(51) Int. Cl.[7] .............................................. A47K 11/00
(52) U.S. Cl. .................................. 4/449; 4/462; 4/484
(58) Field of Search ........................... 4/449, 462, 463, 4/472, 473, 476, 477, 479, 482, 483, 484, 485, 486

(56) References Cited

U.S. PATENT DOCUMENTS

| | | | | |
|---|---|---|---|---|
| 1,080,930 A | * | 12/1913 | Schierding | 4/449 |
| 2,974,321 A | * | 3/1961 | Salka | 4/476 |
| 2,999,247 A | * | 9/1961 | Kulka | 4/462 |
| 3,099,841 A | * | 8/1963 | O'Dell et al. | 4/476 |
| 3,422,985 A | * | 1/1969 | Rinehart | 4/484 |
| 3,435,464 A | * | 4/1969 | Harding | 4/449 |
| 4,161,793 A | * | 7/1979 | Merchan | 4/476 |
| 4,305,164 A | * | 12/1981 | Sargent et al. | 4/463 |
| 4,343,053 A | * | 8/1982 | O'Connor | 4/484 |
| 5,088,134 A | * | 2/1992 | Douglas | 4/484 |

* cited by examiner

*Primary Examiner*—Charles R. Eloshway (57) ABSTRACT

A toilet cabana having a removable container is disclosed. The cabana has a door for ingress and egress of the user and comprises a surrounding enclosure for privacy. The removable container receives waste from the user and comprises a top opening for receiving the waste and an opposite bottom opening. The container holds a removable bag therein. The bag has opposite first and second open ends that are releasably closable. Waste may be emptied from the container either by opening the bottom opening of the container and the open second end of the bag while the bag remains within the container or by removing the bag entirely from the container.

1 Claim, 8 Drawing Sheets

WATERLESS TOILET CABANA

BACKGROUND OF THE INVENTION

This invention relates generally to the field of the chemical toilet cabanas, and more particularly to a toilet module cabana shell with removable container to hold a waste collection bag.

Several Toilet Cabanas have been developed: chemical, outdoors, pre assembled and some other types, using different shapes, floor layouts, construction materials and functional designs. Different inventors have been improving the methods of building, manufacture, and assembly of the toilet cabanas by changing the appearance and components, without paying much attention to the its servicing and maintenance. All have been using the same principle based on the collection of the waste by pumping it from a toilet holding tank to a truck tank, transporting it, then pumping the waste from the truck tank onto a waste disposal site. Conversely, my invention is based on a different philosophy regardless of the shape or material type of their components. Indeed my cabana requires no flushing, no holding tanks and consequently no pumping servicing trucks. This improves the present performance; upgrading the existing toilet cabana concept and adding new features never approached before. In fact, my invention is not limited to outdoor use and is not subject to the expensive, messy and complicated waste and pumping service trucks. The only service required is replacing the disposable plastic bags. This method is ecological since it offers the option of a dry operation and maintenance without the need to flush, and no holding tank to wash resulting in no wastewater. Present chemical toilet cabanas do not disclose the maintenance part though it is a very important element for its operation. To operate the present cabanas is required a costly maintenance and servicing components as pumps, hoses, holding tank trucks and skilled personnel. What is needed is a simple toilet enclosure, without all the expensive servicing elements including the mechanical, electrical, pneumatic or complicated parts to service the cabana and the servicing pump trucks. What is needed is a low cost manufacturing, ensemble and operational toilet cabana module to give consumers and users a totally new option. As stated above, my invention overrides those dramatic drawbacks by not using the hermetic holding tanks and no tanks at all. The present cabana types scope and the consumers market potential is basically limited to the outdoors use and to locations where servicing trucks have a proper access. My cabana instead, does not have this limitation, since there is no need for servicing trucks and because of that it can be also used at locations where access is limited or where presence and appearance is relevant. The only access needed for my cabana is one used by a person to carry out the containers or waste bags by hand, or dolly. Even the cabana itself can be assembled in place and again no truck is needed, making this cabana more affordable and accessible to a larger number of service providers and users. Several inventors have developed several toilet bag devises; however, no one designed or mention their use in conjunction with a chemical toilet cabana and solving all their implications. My invention instead, combines the concepts by creating a new toilet bag philosophy, solve the complications and details resulting from this combination and produces new features never approached before in a functional manner. My invention, as mentioned above upgrades the existing chemical toilet cabana and achieves: novelty design, new features, simple components, low construction cost, easy assembly and transportation, almost maintenance free, a totally dry operation and a broader marketability, among its ecological nature.

The use of bags for collecting waste is not new, however some features have been added to the original idea like the U.S. Pat. No. 2,376,036 granted to Lucy Cotton on May 15, 1945 for a collapsible commodore. While the idea was good for traveling in those days, it would not be pleasant, convenient or practical in the present. The U.S. Pat. No. 2,801,426 granted to Gerald A. La Gorge and Paul Douglas La Gorge issued on Aug. 6, 1957 for a Disposable Bag Toilet, while was good enough for out door activities where there was no adequate toilet facilities, there are a better means now like the toilet cabana. Another intent to solve the problem where no toilet facilities are available is the U.S. Pat. No. 3,063,061 from W. H. Bertram on Nov. 13, 1962 which shows some improvements to the prior art and nothing else. The U.S. Pat. No. 3,435,464 from David B. Hardlin on Apr. 1, 1969 discloses a portable toilet container where by the fecal material has to be removed from the container, and the container cleaned and sanitized without residues. This container has a cover and a closure mechanism, where this closure traps the chemical and waste odor inside the container with no means of ventilation. Conversely my invention has a closure with no moving parts except for hinges and is comprised of a ventilation system even when the toilet opening is closed. Furthermore my container is provided with a bag to collect the waste which implies a dry operation. Once the bag is removed, there is no need to clean the container. The U.S. Pat. No. 3,495,278, issued on Feb. 17, 1970 to A. H. Peters discloses a bucket with a bag as a very basic portable toilet whereby the bag is twisted to close between users with no means for ventilation. The odors remain trapped inside the bag so every time the bag is opened for next user, a stronger odor is present as well as the unpleasant sight of the waste. On Nov. 20, 1973 Charles E. Renn was granted a U.S. U.S. Pat. No. 3,772,712 when he invented a toilet devise which was feasible in a location where vacuum source would be available yet was not feasible for multiple subsequent users. The U.S. Pat. No. 5,088,134 discloses a devise with many moving parts and bearings subject to lubrication, which eventually wear out and fail. The ventilation problem is not solved properly so every time the devise is temporarily open for use the accumulated foul odor escapes, not to mention the unpleasant exposure of the fecal matter to the user. The U.S. Pat. No. 5,193,231 patent issued Mar. 16, 1993 also implies a very complex machine with vacuum lines, and controls, which requires power to operate and is therefore subject to failure. Johannes Loebbert created a U.S. Pat. No. 5,265,285 for a portable toilet using a disposable bag. Due the size and design of this toilet, the bag must be replaced after each use, which may be functional for personal use but not practical. Among the mentioned disadvantages it is important to notice that none of the listed portable toilets are designed to work in conjunction with the toilet cabana, none are designed with a proper closure and at the same time with a non mechanical ventilation system while closed. In general, present toilet devises have no ventilation from inside the bag to the exterior so unpleasant fecal material is visible and the fecal and chemical odor is present every time the bag is open for the next user.

Although several toilet cabanas have been invented, none relying in the collection of the waste with a bag as the one granted to David B. Hardlin on June 1969, U.S. Pat. No. 3,447,167. This toilet has a rigid shell with no frame and a holding tank for the waste within the shell. The U.S. Pat. No. 3,629,874 is an improved toilet cabana design with dual holding tanks. The tanks have to be pumped and cleaned when full. U.S. Pat. Nos. 3,835,480, 3,932,925 and 4,031, 572 granted to George W. Hardlin disclose a plurality of identical shell sections to form the toilet cabana, whereby the cabana base has a depression to support a holding tank for waste. The U.S. Pat. No. 5,251,342 is a much better design for a toilet cabana concept based on a twin-sheet thermoplastic with a holding tank provided with a pyramidal sump in which waste can accumulate. The U.S. Pat. No. 5,500,962 issued Mar. 26, 1996 to Richard L Tagg and U.S. Pat. No. 5,560,050 show some improvements in the construction layout with more room and means for easier transportation and storage. However, his invention also relies on the need for pumping, cleaning and sanitizing the holding tanks. U.S. Pat. No. 5,560,050 specifically states that this toilet functions as both a urinal and toilet. This is more of a disadvantage than an advantage since the urine from men, in most cases, wets the toilet seat. It does not prove that men would raise the seat every time they use the toilet as a urinal, which would expose the next person to a very unhygienic condition specially if the next person wants to sit on the toilet. Besides the inconveniences mentioned in the cases above, all these toilet cabanas rely on holding tanks subject to the pumping and cleaning service, which is expensive and messy. It requires a more serious investment in a reliable truck with a big holding tank, a pump, valves, hoses, etc. Perhaps two trucks to be always able to service the toilet cabanas when one truck is broken, requires mechanical repairs or just service to the truck, their pump or their components.

Furthermore and as indicated in the previously mentioned inventions related to the toilets based on disposable bags for human waste and the toilet cabanas, no one is solving all the issues in a simple economical manner. The current toilet cabanas depend on a holding tank and some of them are subject to power sources. And again there is also no mention of the use in conjunction of a disposable toilet bag with the toilet cabana concept. In regards to the present toilet cabanas, most have a ventilation pipe, which travel from the holding tank to the roof. The odor however, is always present to the user because it escapes from the toilet opening which is larger and closer to the user who is also exposed to the unpleasant sight of fecal material. Instead, my toilet cabana is provided with a ventilation pipe from the inside toilet bag to the roof while the toilet opening is closed so that the waste is not visible and the waste and chemical odor has no access to the cabana interior. This is the first time a new option is provided to users and service providers. It is the first time the improvements are based on a totally different approach. It is also the first time the changes are more than just changing the way to build or layout of the cabana. This is the very first time a toilet cabana is designed to work in combination with a toilet relying on a disposable bag instead of the typical holding tank.

My invention blends these two concepts in a proper manner solving all the issues that result from this combination. This includes the ventilation, the hygienic replacement of the waste bags, the visual exposure to fecal material, and the issue of men's urine on the seat. Indeed the toilet seat does not open unless the person is sitting on it, so men cannot use it. There would be a separate urinal for men. Another advantage is the simple construction involved with no complicated mechanisms, no moving parts (other than hinges), no power source requirement, no vacuum or pressure lines or valves, no bearings and no expensive parts. As well as the fact that the user has no mechanisms to operate so use is simple and maintenance is minimal. It is also a dry operation because there is no need for water to wash holding tanks. There is also no need for holding tank trucks, nor a pumping system and accessories. This is a grand ecological feature, no wastewater, nothing to wash. This is not only a new option; it is a totally new toilet cabana philosophy.

SUMMARY OF THE INVENTION

The primary object of the invention is to provide a new philosophy for the manufacture, use, operation and service of the traditional Toilet Cabana.

Another object of the invention is to provide a new procedure to service the Toilet cabana without the use of the messy pump system and holding tank trucks.

An additional object of the invention is to provide a less expensive operational cost for the traditional toilet cabana concept.

Furthermore, the object of the invention is to provide a more friendly, clean and hygienic toilet cabana for users and service providers.

Yet another object of the invention is to provide a toilet cabana with a better ventilation system. In addition to the benefit on the use of the bag instead of the holding tank, this Toilet Cabana invention provides a toilet that has a closure so the user will not see any of the unpleasant waste; whereby the user weight operates the closure just by sitting on the toilet seat. This also ensures that bad odors will not escape from the toilet. Since the men use the urinal, the seat remains free of men's urine so next person can sit on the seat hygienically. This is not only hygienic; it keeps flies and insects off the toilet cabana.

Other advantages of the present invention will become apparent after the following descriptions, and accompanying drawings, wherein, by way of illustration and example, an embodiment of the present invention is disclosed.

A waterless toilet module cabana shell with a removable housing unit as a container to hold a waste collection bag receptacle comprising the steps of a toilet cabana module with two independent units. A unit composed of a cabana shell with a wall opening for an entrance and at least one more wall opening for (at least) one removable container, which is the second unit. This container consists of a lid, and means to hold at least one waste bag, a toilet opening, a toilet seat, and a rim to hold the collection bag while this bag rests on the container bottom. This bag is to have two openings: one hanging from the mentioned rim and attached by a belt in a peripheral grout around the rim, and a second opening on the bottom to dump the collected waste. Both necks are to be secured by flat plastic tabs or something comparable. When the bag is full, the upper neck is secured and then the bag is released from the rim. Then a pipe fitting which is to feed the container with chemicals, deliver the urine from urinal and providing ventilation is detached from the container so that the container may be pulled out so container may be replaced with another one with a clean bag. Though this procedure may vary, it is at least one way to operate this toilet cabana module as a neat, dry and waterless operation.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. Present toilet cabanas have the same principle, which basically relies on a holding tank to collect waste. When the tank is full, a truck with a pumping system and holding tank has to empty the cabana's holding tank and transport the waste material to a site where it is pumped out from the truck tank. The appearance of the truck, the smell and the cost of that operation made my toilet module a great option instead. In accordance with the present invention, the following drawings show no holding tanks to be pumped, but instead a replaceable waste storage receptacle such as a bag, whereby a new bag is used and disposed of every time the container is exchanged with another. As explained below, the shape and design of the enclosure is not the main part of this invention. The important detail is the fact that this module shows a new approach to dispose of the human waste by the use of a bag, with additional features never considered before. This gives the users and service providers another option when regular toilet facilities are not available.

Figure 1:
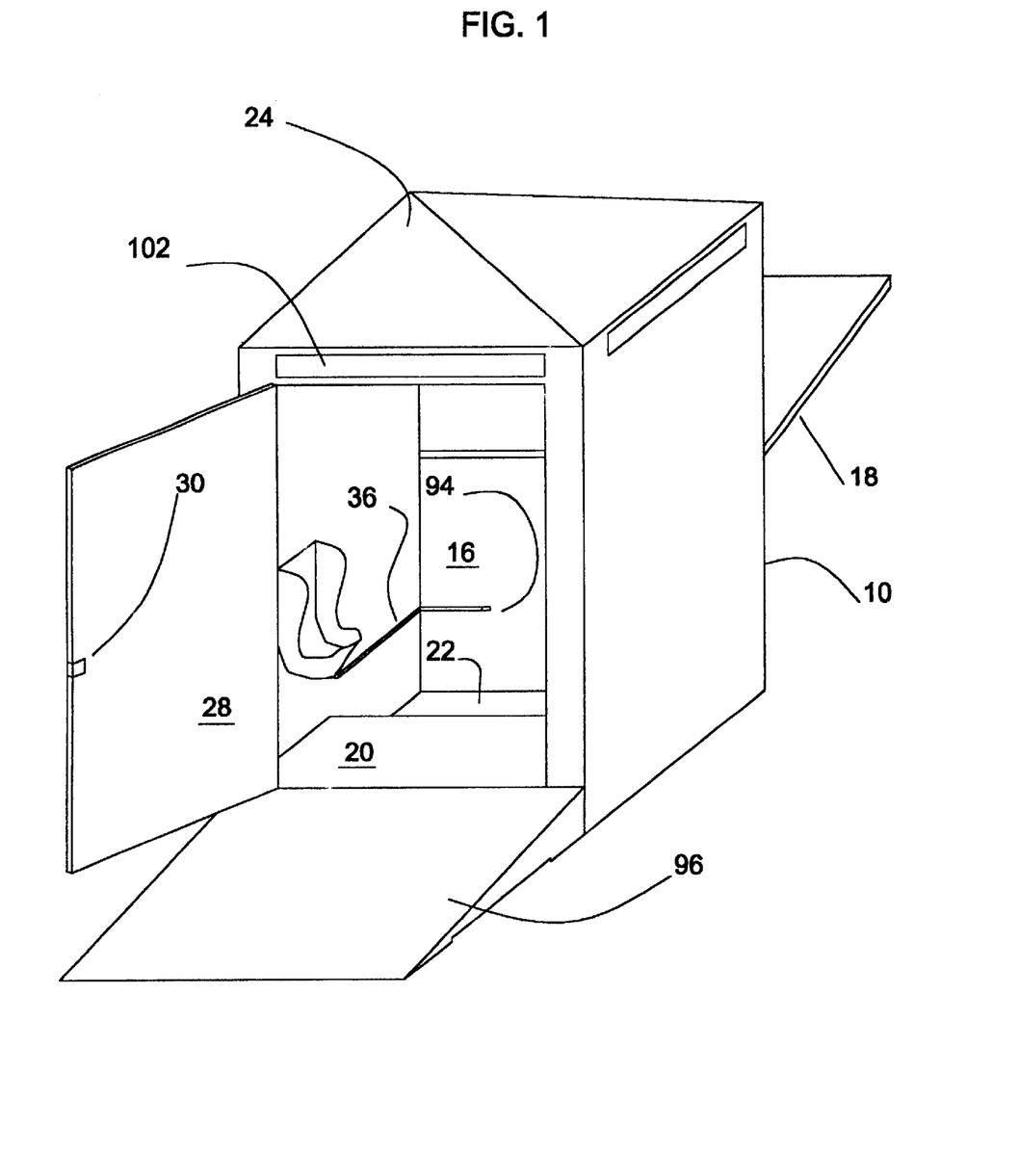
FIG. 1 A front perspective view of the shell unit.
Figure 2:
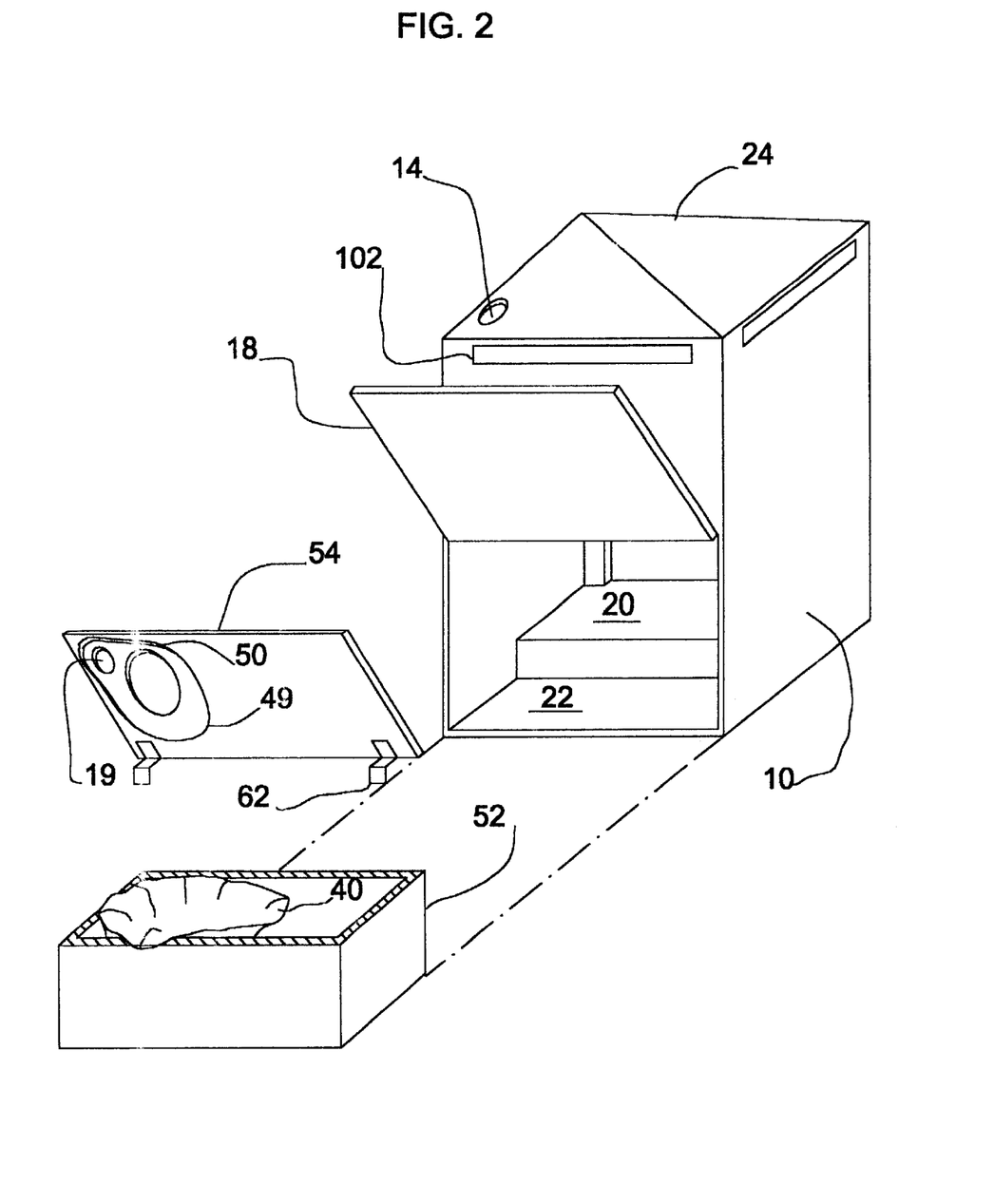
FIG. 2 A rear perspective view of the shell unit with its container.
Figure 3:
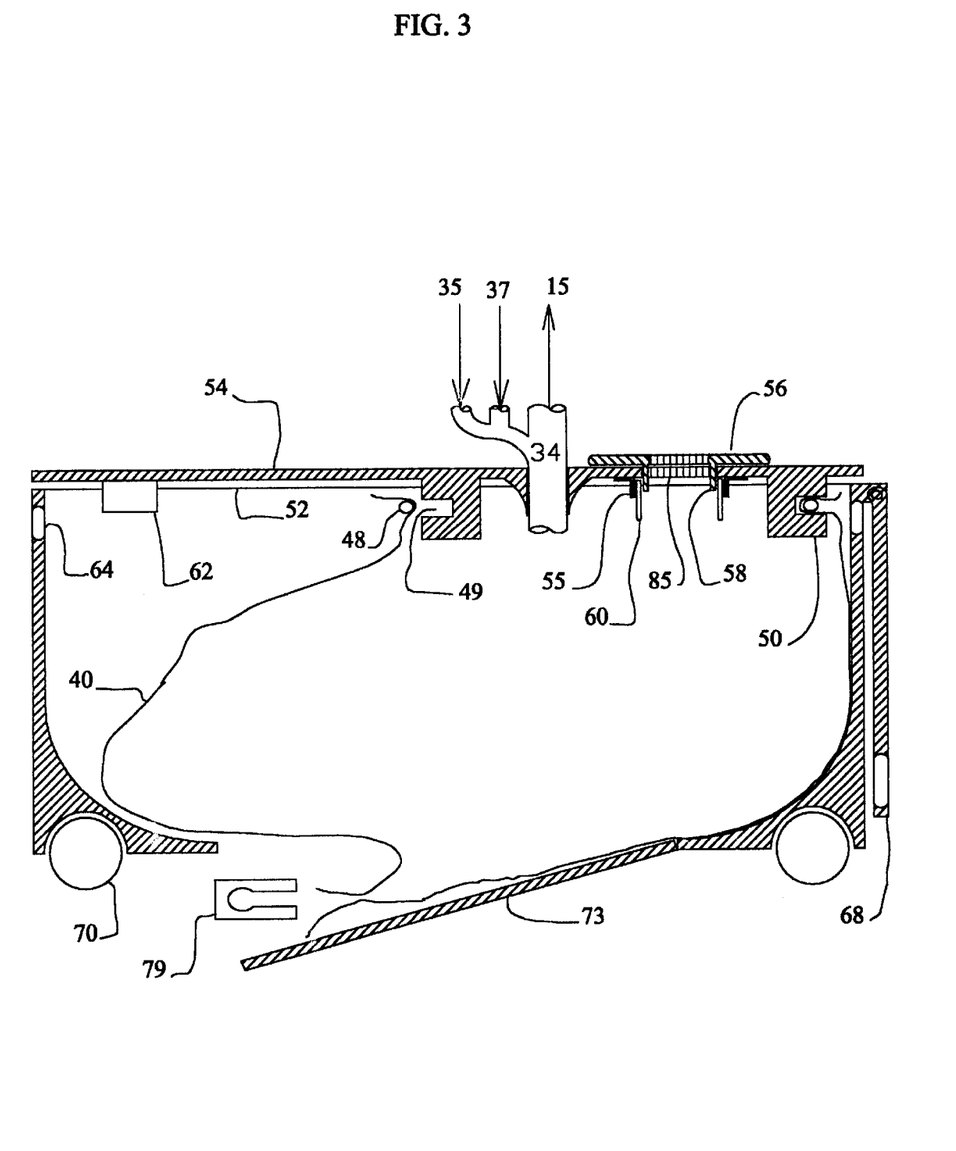
FIG. 3 A cross sectional of the container unit with a single bag for collection of waste from toilet and liquids from urinal.

FIG. 1 shows a front view of a toilet cabana module with a urinal (32), urinal pipe (36), and the cabana shell itself formed basically by a set of walls (10), a roof (24), a floor (20), an optional ramp (96), a couple of vents (102), and two openings. One opening is for an entrance door (28), with a latch (30), and the other to service the unit (18). This second opening is preferably in the rear with the ability to swing sideways or upright as an access for at least one removable housing unit (52) as a container to hold the replaceable waste storage receptacle such as a bag (40). Also shown is the floor support (22) for a container showed in FIG. 2. In FIG. 2, the back of this toilet cabana module is presented. It consists of two independent units: the cabana shell as described in FIG. 1 and the housing container unit (52) to hold the replaceable waste storage receptacle or the bag to collect waste (40). The cabana shell may be built out of any commercial construction materials commonly used to build this type of enclosures, such as thermoformed plastic, or fiberglass, with no specific design or shape. The collection bag is suspended from a rim (50). This rim has a peripheral indentation (49) on its exterior face to grab the bag by a belt like a rubber band (48), so that the bag rests in the container bottom and this rim holds its neck. This (19) lid is attached to the container preferably by four removable hinges (62), so that this lid may be opened from inside, outside or be totally removed to replace the bag. This FIG. 2 also shows an opening (14) for the ventilation pipe which leads to the inside of the bag through an opening on the container lid (19) located between the mentioned rim (50) and the toilet opening. Its purpose is for the insertion of a pipe fitting connector (34) shown in FIG. 3. This connector has direct access to the bag chamber in order to add chemicals and deodorants through one of those multiple connector inlets (37), collect liquids from urinal through another inlet (35) and let the produced gases and bad odor to exhaust through the outlet (15) contained in the same connector. Regardless of the shape of this connector, this is a very important feature in this invention because it allows the odors to exit from the inside bag directly to the exterior without passing through the cabana enclosure, delivers the chemicals from dispenser and the urine from the urinal, whereby this connector has the purpose to make easier the attachment and detachment of this connector from the container lid when the container is replaced with another one with a new bag. FIG. 3 also shows a bottom gate (73) and means to secure it, for the purpose of emptying the waste bag as an option instead of replacing the whole bag with a new one. The bag's bottom opening is operated by any common bag closure like the plastic tab (79). The toilet seat (56), which is attached to the container lid over the toilet opening, has one or two spring removable hinges (87). This allows for the seat to be removed when the container and the bag within it is removed and transported, making easier to stack these containers one on top of the other. Another advantage in having this toilet seat removable is that without the action of the toilet cams (58) on the closure this remains closed by the action of the closure spring hinges, so the full bag remains close and enclosed inside the container, as will be explained below. FIG. 3 also shows two or four handlers (64), optional wheels (70), and an optional pulling bar (68). The purpose of these three items is to remove the container and reinstall another one with a new bag easily. For the purpose of stacking these containers when empty in the service provider shop, the inside walls are concave therefore a container may fit one inside the other though this curved walls may be designed of any shape and because of that are not showed on the drawings.

As an option, this container may also act without the cabana shell and be used as a portable toilet with the use of a more simple enclosure or out of sight. Also optional is the use of the same showed container in conjunction with a permanent shell built out of regular construction materials such as block and stucco. This would be practical for locations where seasonal events take place such that the portable unit may be installed temporary and be serviced by replacing the bags as needed during the season or as demands. Shown in FIGS. 3 and 4, the toilet seat is provided with the cams mentioned above. They are attached underneath the seat, consequently when the seat is pushed down by the weight of a person sitting on it, these cams plunged down the closure doors (60) and opened. These doors are attached underneath the container lid by spring hinges (55), so that when the seat is raised, the closure doors are closed by the action of the closure spring hinges.

Figure 4:
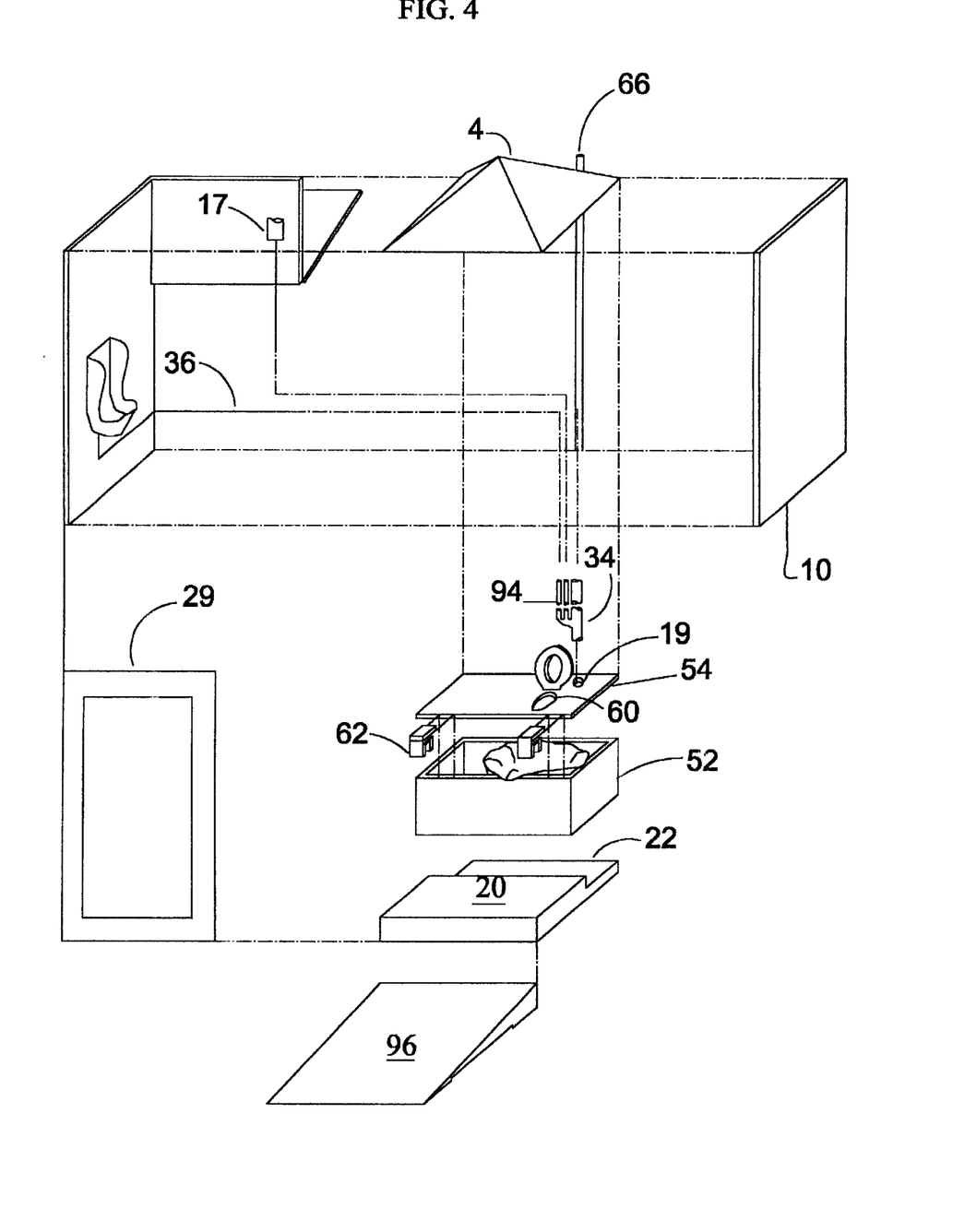
FIG. 4 An illustration of an exploded view of the main parts of this toilet cabana module showing the shell unit and the toilet container unit.
Figure 5:
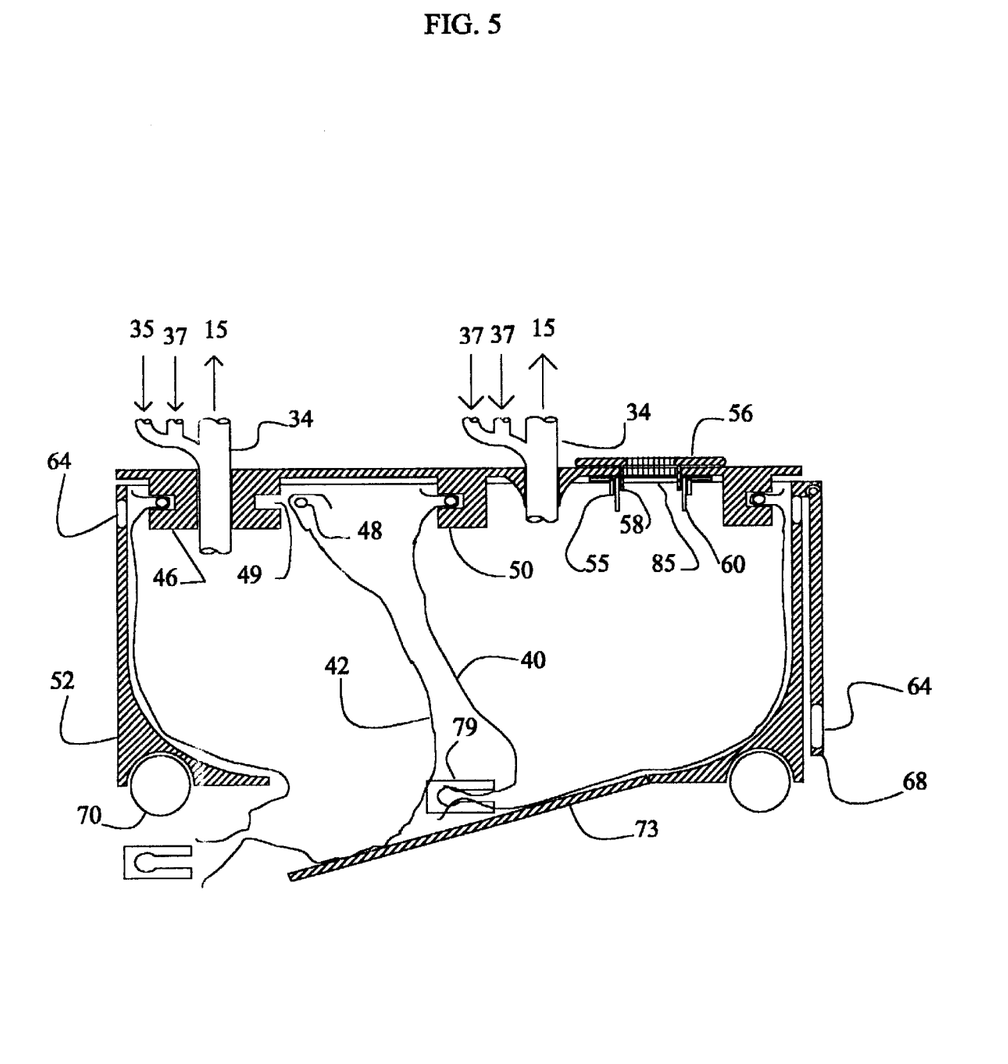
FIG. 5 A cross sectional of the container with one bag to collect liquids from urinal and another one to collect waste from toilet.
Figure 6:
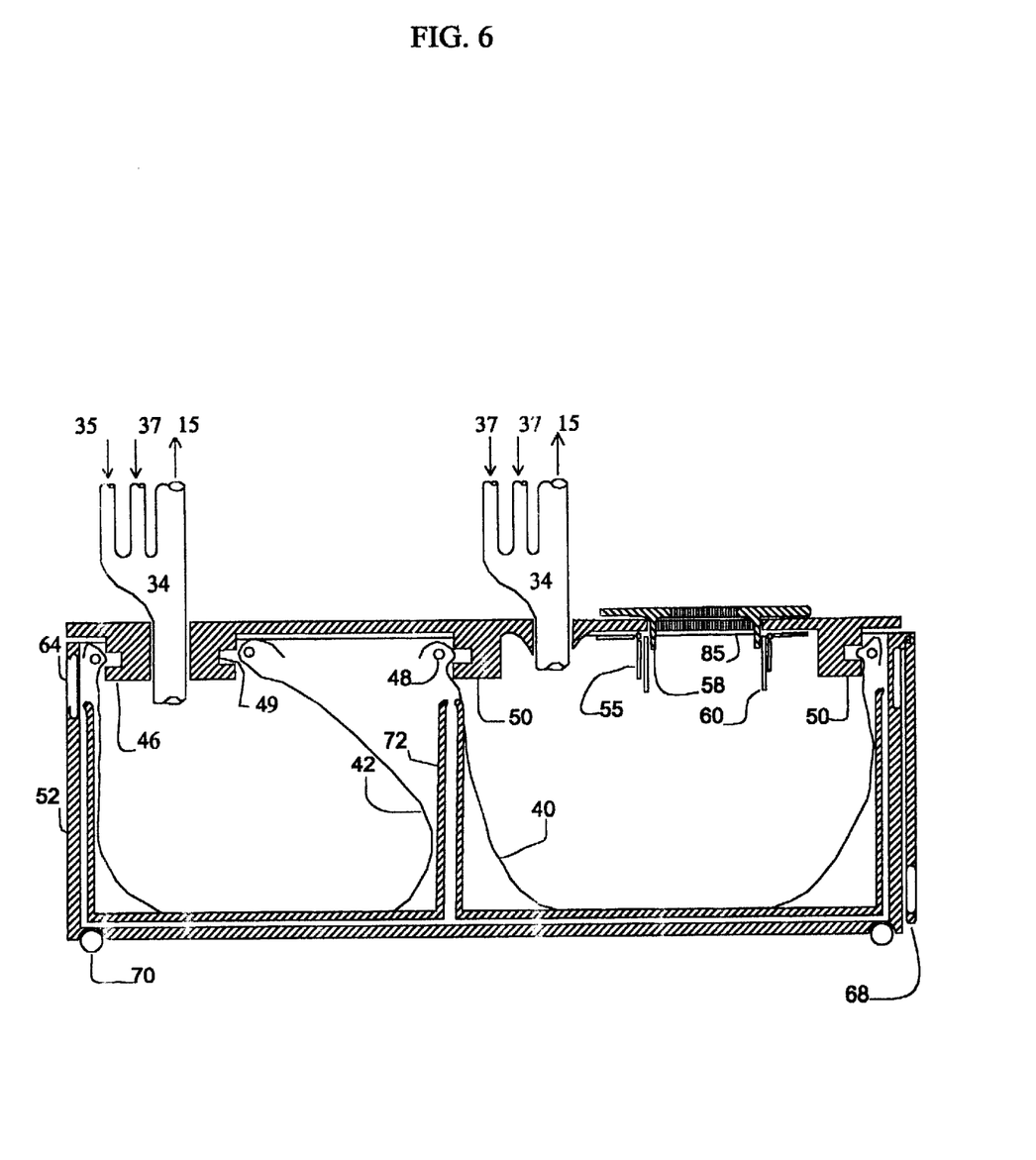
FIG. 6 Is a cross sectional of the container with two buckets whereby one bag is to collect liquids from urinal and is inside one of this buckets and another one is to collect waste from toilet and is inside the other bucket.
Figure 7:
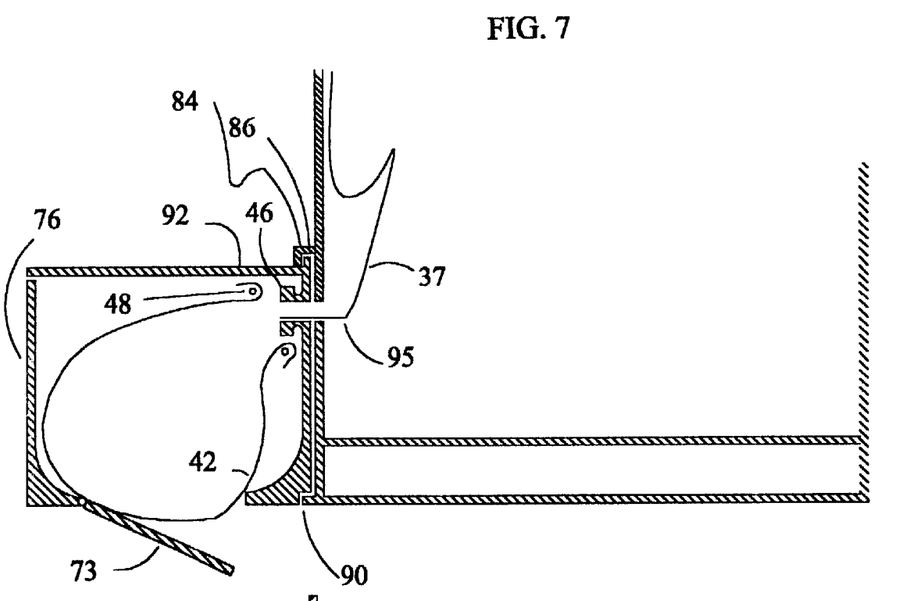
FIG. 7 A side cross section view of another arrangement with a separate exterior urinal container.
Figure 8:
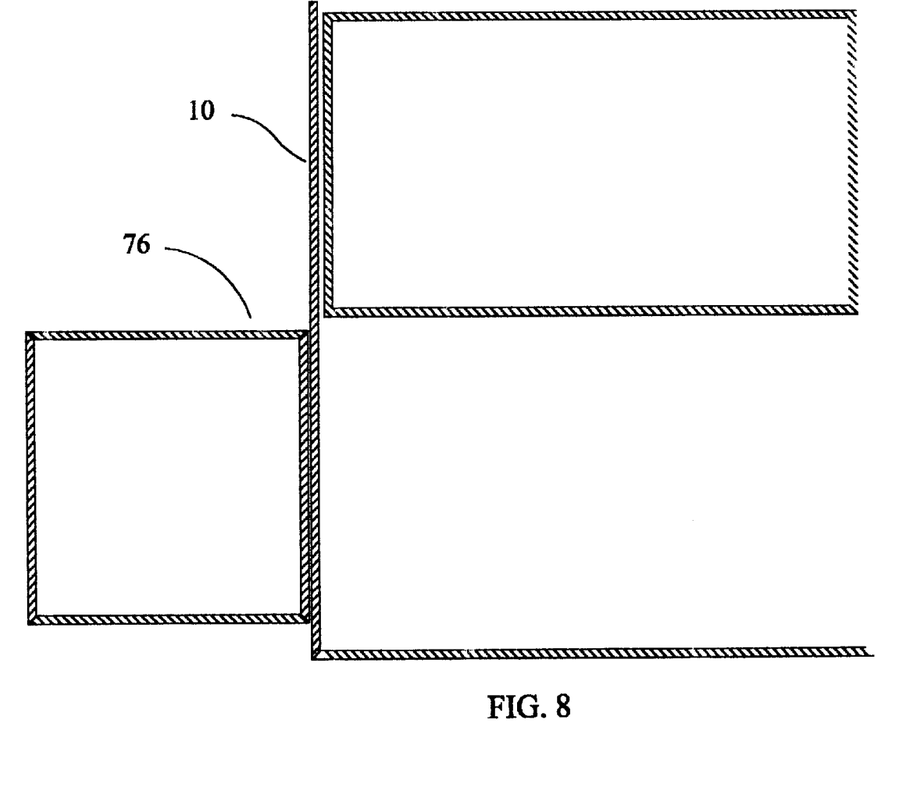
FIG. 8 A floor plan cross-section view of the same arrangement with the urinal container on the exterior.
Figure 9:
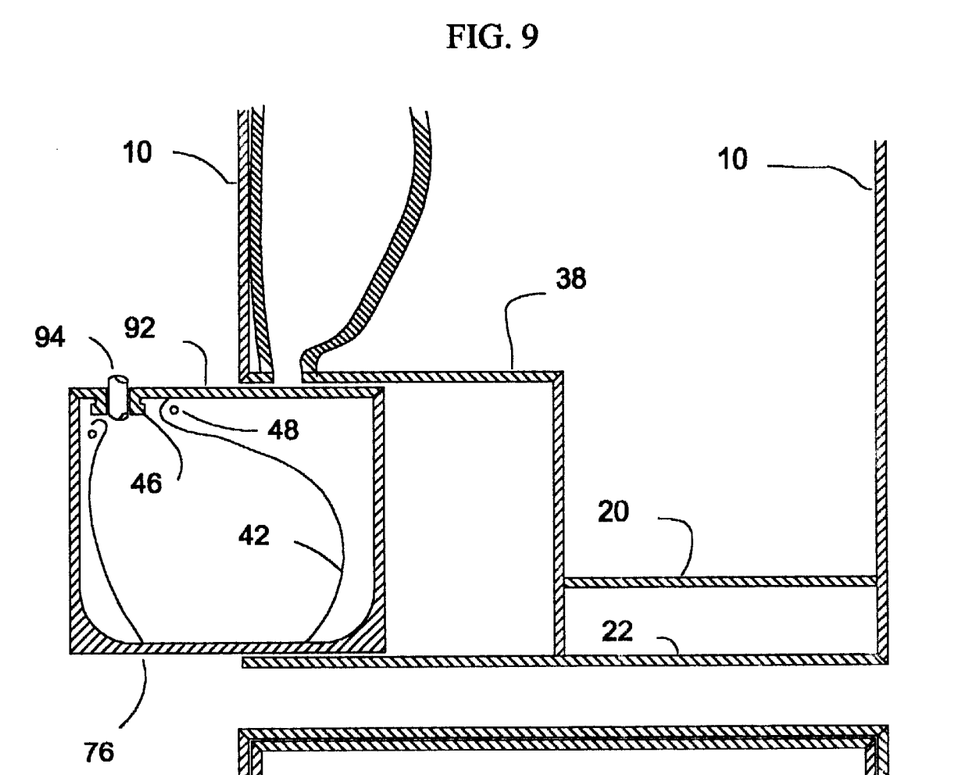
FIG. 9 A side cross section view of a similar arrangement with the urinal container inside the shell unit.
Figure 10:
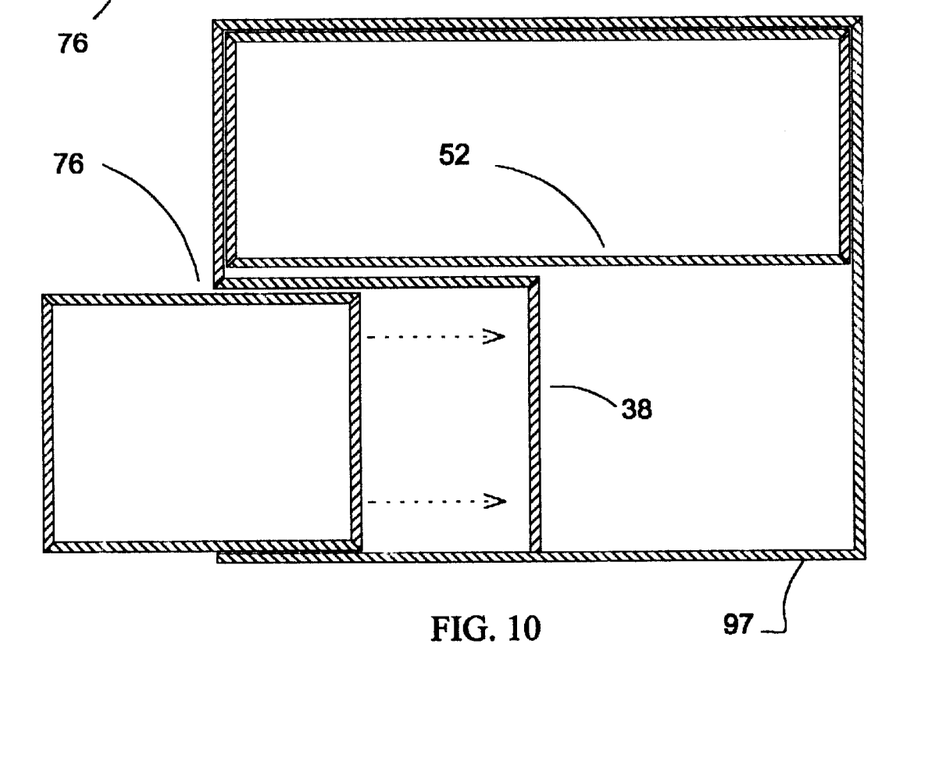
FIG. 10 A floor plan cross-section view of the same arrangement with the urinal container inside the shell unit.

FIG. 4 is an exploded view that shows most of the basic components of this toilet cabana module as explained in FIGS. 1,2,3. The following elements are also demonstrated; the toilet seat spring hinges (87) for the purpose of maintaining the toilet seat upright so the cams underneath this seat do not touch the closure. Consequently, the closure spring hinges maintain the closure closed when toilet is not in use. Said closure opens by the action of a couple of the multi-mentioned cams so that every time the toilet seat is pushed down by the weight of the user, the cam is plunged into the closure doors causing them to open whereby the spring torque resistance of the toilet seat hinge is less than the weight of a small child, and the hinge torque resistance of the closure is smaller than the spring torque resistance of the toilet seat hinges; so that, even a small child's weight is enough to transmit the movement required for the seat to go down. Therefore, the cams must be able to reach the closure doors and be able to open it so that the toilet can be used without seeing the unpleasant waste and smelling the odor when the person enters the toilet module. The same exploded figure also shows the door frame (29), and the urinal pipe whereby this pipe is provided with a regular one-way valve for liquids (44), consequently odors from the bag do not travel back up. The chemical and deodorant dispenser (17), and the pipe connections (15), (35), (37), the vent pipe (66), and the flexible hoses (94), are also depicted. As explained above, this container lid (54) has at least one rim bag assembly (50) to hold a bag for the collection of waste from the toilet and liquids from the urinal (32). The rim of the toilet opening is attached underneath the container lid and around this toilet opening. The diameter of this rim is larger than the toilet opening to allow enough room for the pipe connector inlet (19). The purpose of the bottom door (73) is for emptying the waste from the bag by releasing the bag closure (79). The lid of this container (54) is hinged by several of removable hinges (62) attached to the top edges of the container's walls (52), for the purpose of replacing the waste bags. These hinges may be attached to the container simply with pressure and be secured with a bolt when needed. This is a convenient feature especially when waste bags are to be replaced merely by closing the upper bag neck with the plastic tabs, detaching it from rim, and removing from container by hand. Alternatively, buckets (72) with a handler may be used, as shown in FIG. 6. However, another way to operate the bag replacement is to remove the container from the cabana module by the pulling the bar by hand or using a dolly. Then the container lid must be opened and a closure tab placed on the upper bag neck, then the container is replaced with another one with a new bag already in place making this operation fast, clean and totally dry. As explained above the container and the bag filled with waste, is then taken into a small shop to empty the bags from the container bottom gate by releasing the bottom plastic tab closure at a dedicated disposal sewer site. As an option, the bags can be also disposed without empty those up if the disposal site is the proper one. FIGS. 7 and 8 shows another alternative for the urinal. This alternative allowed the unit to increase their waste capacity by giving the urinal (32) its own container (76), which contains its own waste bag (42) without restricting the toilet bag capacity. This urinal container is also comprised of a lid (92), a rim (46), a rubber band (48), a connector (95) for ventilation and deodorant pipe, and a tongue and grew parts (84), (86) and (90) to attach this container (76) to the cabana wall (10). FIGS. 9 and 10 illustrate a similar arrangement to that of FIGS. 7 and 8 which have the container inside the cabana module. This may be used as a step for small children, showing basically the same elements and the pipe connector (99).

While the invention has been described in conjunction with a preferred embodiment, it is not intended to limit the scope of the invention to the particular form set forth, but instead to cover such alternatives, modifications, and equivalents as may be included within the spirit and scope of the invention as defined by the appended claims.

What is claimed is:

1. A toilet cabana comprising:
    a cabana enclosure having an opening for ingress and egress of a user;
    a container removable from the cabana enclosure, the container having a first opening therein for receiving waste from the user and a second opening opposite the first opening; and
    a disposable bag received within the container, the disposable bag having first and second releasably closable open ends, a first end being positioned within the container such that it surrounds the first opening and receives waste therein from the user, the second end being accessible through the second opening in the container and openable to empty the contents of the bag through the second opening without removing the bag from the container.

* * * * *